(12) United States Patent  (10) Patent No.: US 8,996,647 B2
Lingafelt et al.  (45) Date of Patent: Mar. 31, 2015

(54) OPTIMIZING STORAGE BETWEEN MOBILE DEVICES AND CLOUD STORAGE PROVIDERS

(75) Inventors: Charles S. Lingafelt, Durham, NC (US); James W. Murray, Durham, NC (US); James T. Swantek, Canton, GA (US); James S. Worley, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 501 days.

(21) Appl. No.: 12/796,738

(22) Filed: Jun. 9, 2010

(65) Prior Publication Data

US 2011/0307573 A1 Dec. 15, 2011

(51) Int. Cl.
*G06F 15/16* (2006.01)
*G06Q 10/10* (2012.01)
*G06Q 30/04* (2012.01)
*G06Q 40/00* (2012.01)

(52) U.S. Cl.
CPC .......... *G06Q 10/10* (2013.01); *G06F 2212/262* (2013.01); *G06F 2212/263* (2013.01); *G06F 2212/264* (2013.01); *G06F 2212/261* (2013.01); *G06Q 30/04* (2013.01); *G06Q 40/12* (2013.01)
USPC .......................................... 709/217; 709/219

(58) Field of Classification Search
CPC ................... H04L 29/08558; H04L 67/1097; G06F 3/067; G06F 17/30197; G06F 2212/263
See application file for complete search history.

(56) References Cited

U.S. PATENT DOCUMENTS

| | | |
|---|---|---|
| 5,163,131 A | 11/1992 | Row et al. |
| 7,197,576 B1 | 3/2007 | Lo et al. |
| 7,257,694 B2 | 8/2007 | Serizawa et al. |
| 7,434,017 B2 | 10/2008 | Maruyama et al. |
| 7,441,009 B2 | 10/2008 | Shinohara |
| 7,523,273 B2 | 4/2009 | Gusler et al. |
| 7,636,764 B1 | 12/2009 | Fein et al. |
| 8,407,190 B2 * | 3/2013 | Prahlad et al. ................ 707/692 |

(Continued)

OTHER PUBLICATIONS

Mell et al., "The NIST Definition of Cloud Computing", National Institute of Standards and Technology, Information Technology Laboratory, Version 15, Oct. 7, 2009, 2 pages.

(Continued)

*Primary Examiner* — Azizul Choudhury
(74) *Attorney, Agent, or Firm* — William E. Schiesser; Keohane & D'Alessandro PLLC; Maxine L. Barasch

(57) ABSTRACT

Embodiments of the present invention provide a solution to optimize data transfer between a mobile device and a cloud storage provider. Specifically, embodiments of the present invention may select one or more files for transfer from the mobile device to a cloud storage device based on an analysis of a set (at least one) of factors such as: (1) the percentage of local storage being consumed on the mobile device; (2) the mobile device's billing plan, and whether file transfer will cause the billing plan to be exceeded; (3) a capacity of a link between the mobile device and the cloud storage provider; (4) dates of last access for files stored on the mobile device; and/or (5) a battery power remaining in the mobile device (if applicable). Any files selected based on an analysis of these factors can be transferred via the link and deleted from the mobile device. Typically, a file is a candidate for transfer if it has not been accessed recently (e.g., within a certain time period), the link and billing plan can accommodate the transfer of the file (e.g., determined based on the size of the file), and there is sufficient power to make the file transfer.

19 Claims, 6 Drawing Sheets

(56) References Cited

U.S. PATENT DOCUMENTS

| | | | |
|---|---|---|---|
| 2002/0013832 A1 | 1/2002 | Hubbard | |
| 2004/0054866 A1 | 3/2004 | Blumenau et al. | |
| 2004/0236796 A1 | 11/2004 | Bhatt et al. | |
| 2005/0102329 A1 | 5/2005 | Jiang et al. | |
| 2005/0273486 A1 | 12/2005 | Keith, Jr. | |
| 2006/0101204 A1 | 5/2006 | Bao | |
| 2007/0198463 A1 | 8/2007 | Sarakas | |
| 2008/0148270 A1 | 6/2008 | Gopisetty et al. | |
| 2008/0274722 A1* | 11/2008 | Kim et al. | 455/418 |
| 2008/0301332 A1 | 12/2008 | Butler et al. | |
| 2009/0109898 A1* | 4/2009 | Adams et al. | 370/328 |
| 2009/0138547 A1* | 5/2009 | Boudreau | 709/203 |
| 2009/0300210 A1 | 12/2009 | Ferris | |
| 2009/0313377 A1 | 12/2009 | Crawford | |
| 2010/0010944 A1* | 1/2010 | Cheng et al. | 706/12 |
| 2010/0057913 A1 | 3/2010 | DeHaan | |
| 2010/0058332 A1 | 3/2010 | DeHaan | |
| 2010/0131592 A1* | 5/2010 | Zhang et al. | 709/203 |
| 2010/0287256 A1* | 11/2010 | Neilio | 709/217 |
| 2010/0311393 A1* | 12/2010 | Castleman | 455/412.1 |
| 2011/0134983 A1* | 6/2011 | Mallya et al. | 375/225 |
| 2011/0145153 A1* | 6/2011 | Dawson et al. | 705/80 |
| 2011/0276442 A1* | 11/2011 | Momtahan et al. | 705/30 |

OTHER PUBLICATIONS

Maitland, J., "Keeping Control Isn't Easy", Chapter 4: Cloud-Based Infrastructure, SearchCloudComputing.com, 13 pages.

* cited by examiner

OPTIMIZING STORAGE BETWEEN MOBILE DEVICES AND CLOUD STORAGE PROVIDERS

TECHNICAL FIELD

The present invention generally relates to cloud computing. Specifically, the present invention relates to optimizing storage between mobile devices and cloud providers.

BACKGROUND

The cloud computing environment is an enhancement to the predecessor grid environment, whereby multiple grids and other computation resources may be further abstracted by a cloud layer, thus making disparate devices appear to an end-user as a single pool of seamless resources. These resources may include such things as physical or logical compute engines, servers and devices, device memory, storage devices, networks, business applications and other software, and the like.

With the increasing number of applications that can run on mobile devices, which require storage both for the application as well as for the data files associated with the application, there exists a need to off-load files from the mobile device into a secondary storage system. The advent of cloud computing and the ability to purchase both services and capacity from multiple cloud providers have provided an alternative secondary storage system that can be utilized by mobile devices. However, to utilize secondary storage in the mobile device environment, there are obstacles that need to be overcome.

SUMMARY

In general, embodiments of the present invention provide a solution to optimize data transfer between a mobile device and a cloud storage provider. Specifically, embodiments of the present invention may select one or more files for transfer from the mobile device to a cloud storage device based on an analysis of a set (at least one) of factors such as: (1) the percentage of local storage being consumed on the mobile device; (2) the mobile device's billing plan, and whether file transfer will cause the billing plan to be exceeded; (3) a capacity of a link between the mobile device and the cloud storage provider; (4) dates of last access for files stored on the mobile device; and/or (5) a battery power remaining in the mobile device (if applicable). Any files selected based on an analysis of these factors can be transferred via the link and deleted from the mobile device. Typically, a file is a candidate for transfer if it has not been accessed recently (e.g., within a certain time period), the link and billing plan can accommodate the transfer of the file (e.g., determined based on the size of the file), and there is sufficient power to make the file transfer.

A first aspect of the present invention provides a method for optimizing data transfer between a mobile device and a cloud storage provider, comprising: conducting an analysis of a billing plan of the mobile device and an amount of data that can be transferred from the mobile device while remaining within the billing plan; determining a capacity of a link between the mobile device and the cloud storage provider; determining dates of last access of a set of files on the mobile device; selecting at least one file from the set of files for transfer to the cloud storage provider based on the analysis, the capacity, and the dates of last access; and transferring the at least one file via the link.

A second aspect of the present invention provides a system for optimizing data transfer between a mobile device and a cloud storage provider, comprising: a bus; a processor coupled to the bus; and a memory medium coupled to the bus, the memory medium comprising instructions to: conduct an analysis of a billing plan of the mobile device and an amount of data that can be transferred from the mobile device while remaining within the billing plan; determine a capacity of a link between the mobile device and the cloud storage provider; determine dates of last access of a set of files on the mobile device; select at least one file from the set of files for transfer to the cloud storage provider based on the analysis, the capacity, and the dates of last access; and transfer the at least one file via the link.

A third aspect of the present invention provides a computer program product for optimizing data transfer between a mobile device and a cloud storage provider, the computer program product comprising a computer readable storage media, and program instructions stored on the computer readable storage media, to: conduct an analysis of a billing plan of the mobile device and an amount of data that can be transferred from the mobile device while remaining within the billing plan; determine a capacity of a link between the mobile device and the cloud storage provider; determine dates of last access of a set of files on the mobile device; select at least one file from the set of files for transfer to the cloud storage provider based on the analysis, the capacity, and the dates of last access; and transfer the at least one file via the link.

A fourth aspect of the present invention provides a method for deploying a system optimizing data transfer between a mobile device and a cloud storage provider, comprising: providing a computer infrastructure having functionality to conduct an analysis of a billing plan of the mobile device and an amount of data that can be transferred from the mobile device while remaining within the billing plan; determine a capacity of a link between the mobile device and the cloud storage provider; determine dates of last access of a set of files on the mobile device; select at least one file from the set of files for transfer to the cloud storage provider based on the analysis, the capacity, and the dates of last access; and transfer the at least one file via the link.

BRIEF DESCRIPTION OF THE DRAWINGS

These and other features of this invention will be more readily understood from the following detailed description of the various aspects of the invention taken in conjunction with the accompanying drawings in which.

Figure 1:
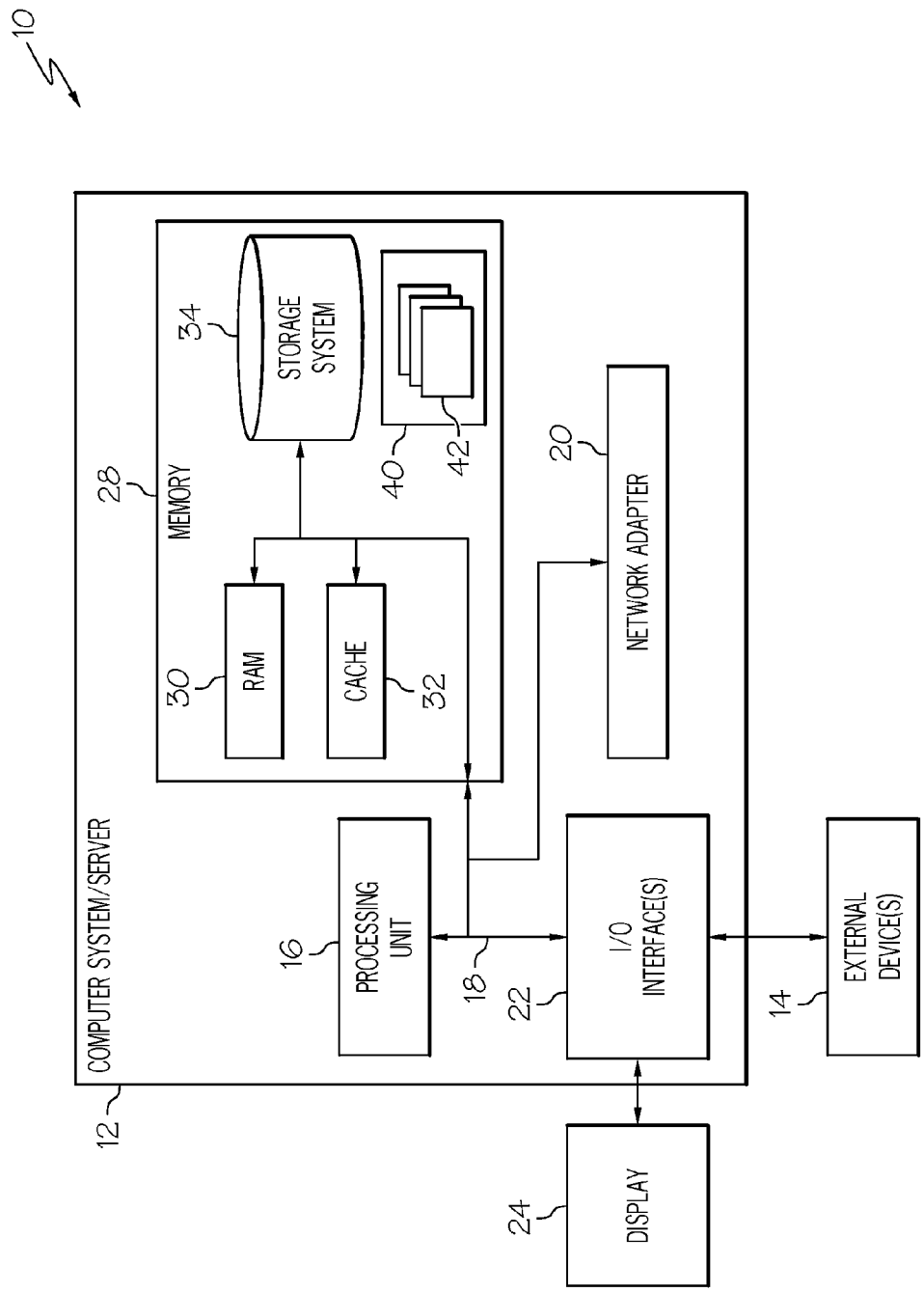
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

For convenience, the Detailed Description has the following sections:

I. Cloud Computing Definitions
II. Detailed Implementation of Embodiments of the Invention I. Cloud Computing Definitions It is understood in advance that although this disclosure includes a detailed description on cloud computing, implementation of the teachings recited herein are not limited to a cloud computing environment. Rather, the embodiments of the present invention are capable of being implemented in conjunction with any type of clustered computing environment now known or later developed.

In any event, the following definitions have been derived from the "Draft NIST Working Definition of cloud Computing" by Peter Mell and Tim Grance, dated Oct. 7, 2009, which is cited on an IDS filed herewith, and a copy of which is attached thereto.

cloud computing is a model for enabling convenient, on-demand network access to a shared pool of configurable computing resources (e.g., networks, servers, storage, applications, and services) that can be rapidly provisioned and released with minimal management effort or service provider interaction. This cloud model promotes availability and is comprised of at least five characteristics, at least three service models, and at least four deployment models.

Characteristics are as follows:

On-demand self-service: A consumer can unilaterally provision computing capabilities, such as server time and network storage, as needed, automatically without requiring human interaction with each service's provider.

Broad network access: Capabilities are available over a network and accessed through standard mechanisms that promote use by heterogeneous thin or thick client platforms (e.g., mobile phones, laptops, and PDAs).

Resource pooling: The provider's computing resources are pooled to serve multiple consumers using a multi-tenant model, with different physical and virtual resources dynamically assigned and reassigned according to consumer demand. There is a sense of location independence in that the consumer generally has no control or knowledge over the exact location of the provided resources but may be able to specify location at a higher level of abstraction (e.g., country, state, or datacenter). Examples of resources include storage, processing, memory, network bandwidth, and virtual machines.

Rapid elasticity: Capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): The capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): The capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: The cloud infrastructure is operated solely for an organization. It may be managed by the organization or a third party and may exist on-premises or off-premises.

Community cloud: The cloud infrastructure is shared by several organizations and supports a specific community that has shared concerns (e.g., mission, security requirements, policy, and compliance considerations). It may be managed by the organizations or a third party and may exist on-premises or off-premises.

Public cloud: The cloud infrastructure is made available to the general public or a large industry group and is owned by an organization selling cloud services.

Hybrid cloud: The cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability.

II. Detailed Implementation of Embodiments of the Invention

As indicated above, embodiments of the present invention provide a solution to optimize data transfer between a mobile device and a cloud storage provider. Specifically, embodiments of the present invention may select one or more files for transfer from the mobile device to a cloud storage device based on an analysis of a set (at least one) of factors such as: (1) the percentage of local storage being consumed on the mobile device; (2) the mobile devices' billing plan, and whether file transfer will cause the billing plan to be exceeded; (3) a capacity of a link between the mobile device and the cloud storage provider; (4) dates of last access for files store on the mobile device; and/or (5) (if applicable) a battery power remaining in the mobile device. Any files selected based on an analysis of these factors can be transferred via the link and deleted from the mobile device. Typically, a file is a candidate for transfer if it has not been accessed recently (e.g., within a certain time period), the link and billing plan can accommodate the transfer of the file (e.g., determined based on the size of the file), and there is sufficient power to make the file transfer.

Referring now to FIG. 1, a schematic of an exemplary cloud computing node is shown. Cloud computing node 10 is only one example of a suitable cloud computing node and is not intended to suggest any limitation as to the scope of use or functionality of the invention described herein. Regardless, cloud computing node 10 is capable of being implemented and/or performing any of the functions set forth in Section I above.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules include routines, programs, objects, components, logic, data structures, and so on, that perform particular tasks or implement particular abstract data types. The exemplary computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media and removable and non-removable media.

System memory 28 can include computer system readable media in the form of volatile memory, such as random access memory (RAM) 30 and/or cache memory 32. Computer system/server 12 may further include other removable/non-removable and volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of the invention.

The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

A computer readable signal medium may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
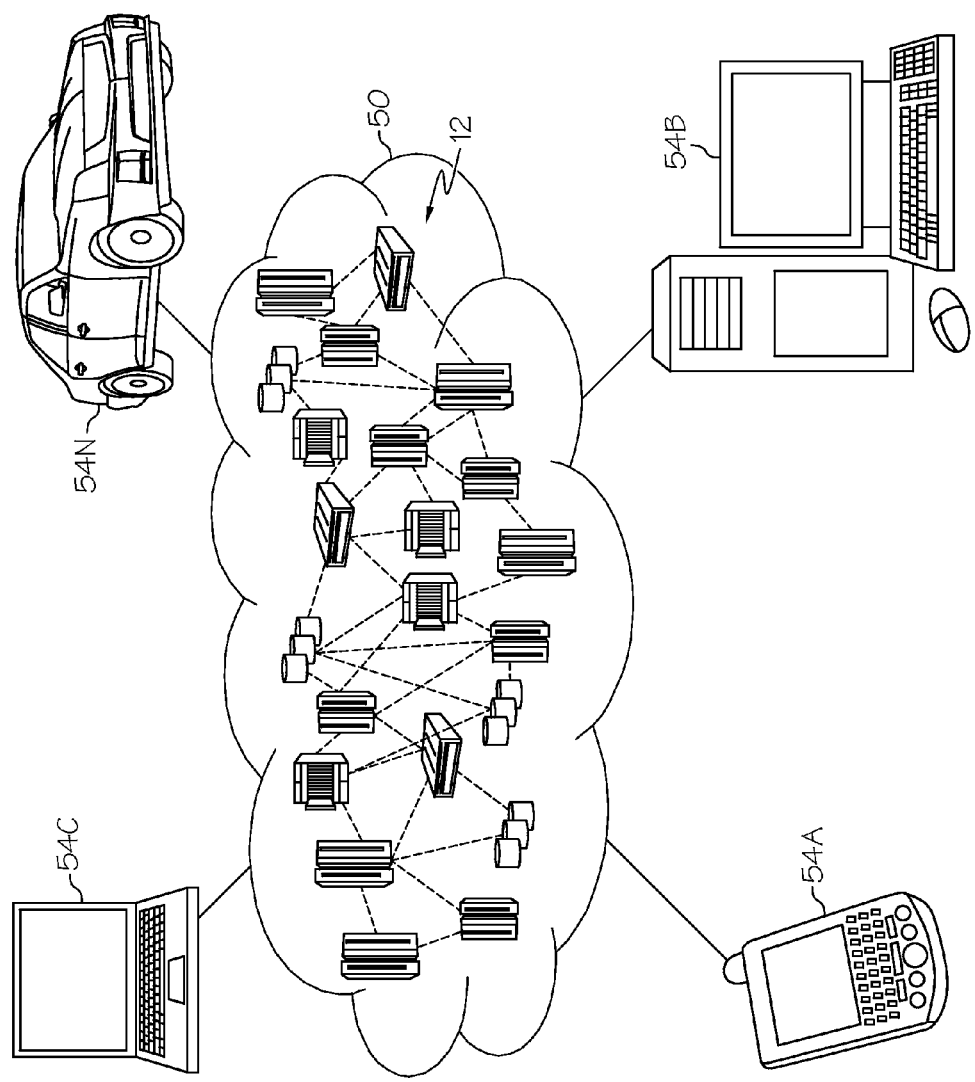
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 12 with which computing devices such as, for example, personal digital assistant (PDA) or cellular telephone 54A, desktop computer 54B, laptop computer 54C, and/or automobile computer system 54N communicate. This allows for infrastructure, platforms, and/or software to be offered as services (as described above in Section I) from cloud computing environment 50, so that each client does not have to separately maintain such resources. It is understood that the types of computing devices 54A-N shown in FIG. 2 are intended to be illustrative only and that cloud computing environment 50 can communicate with any type of computerized device over any type of network and/or network/addressable connection (e.g., using a web browser).

Figure 3:
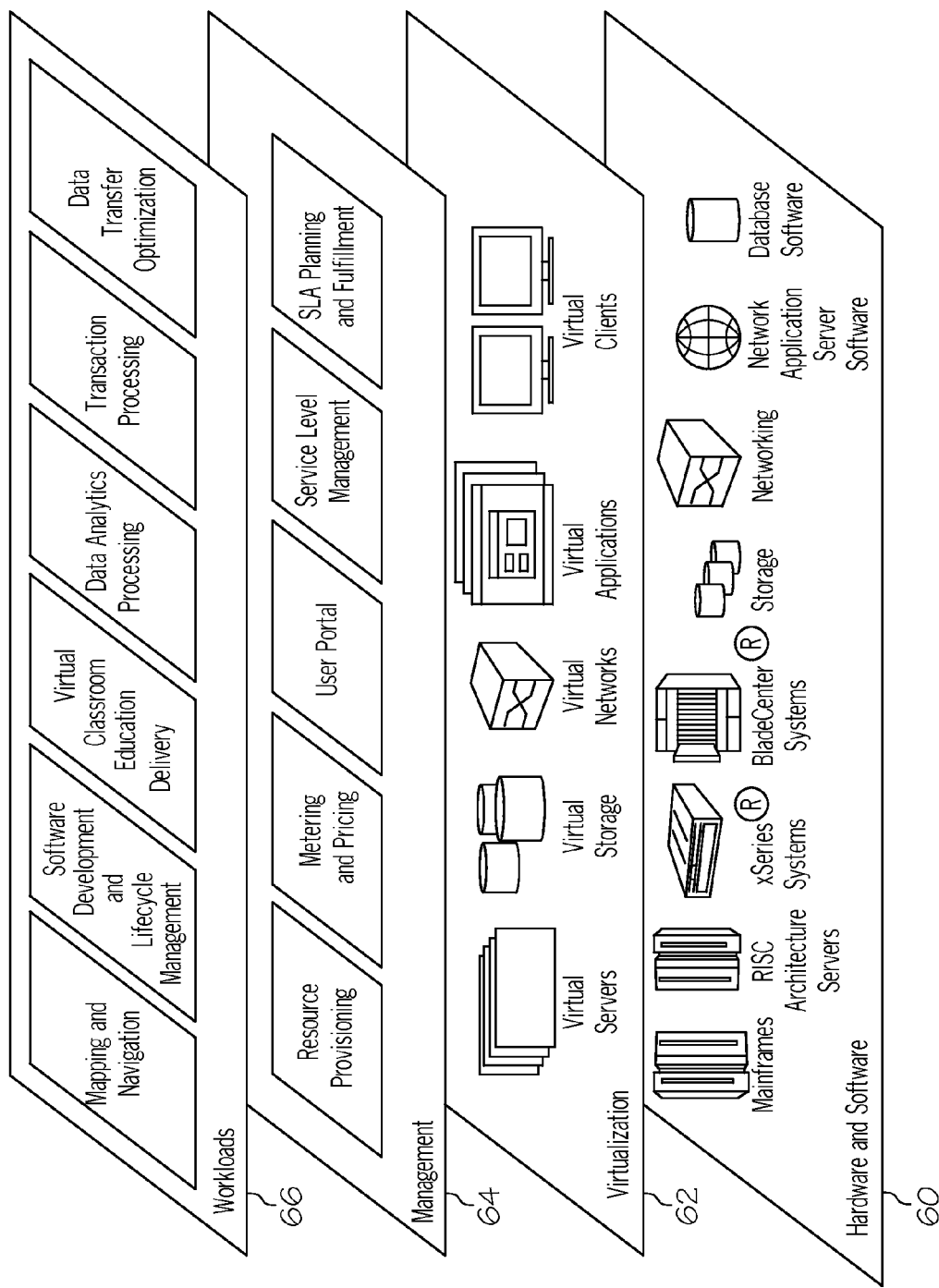
FIG. 3 depicts cloud abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only, and the invention is not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems; IBM xSeries® systems; IBM BladeCenter® systems; storage devices; networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation in the United States, other countries, or both.)

Virtualization layer 62 provides an abstraction layer from which the following exemplary virtual entities may be provided: virtual servers; virtual storage; virtual networks, including virtual private networks; virtual operating system (s), virtual applications; and virtual clients.

Management layer 64 provides the exemplary functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for consumers/users and tasks, as well as protection for data and other resources. User portal provides access to the cloud computing environment for both users and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides functionality for which the cloud computing environment is utilized. Examples of workloads and functions which may be provided from this layer include: mapping and navigation; software development and lifecycle management; virtual classroom education delivery; data analytics processing; transaction processing; and data transfer optimization. As mentioned above, all of the foregoing examples described with respect to FIG. 3 are illustrative only, and the invention is not limited to these examples.

It is understood functions of the present invention as described herein are typically performed by the data transfer optimization function, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 2.

It is reiterated that although this disclosure includes a detailed description on cloud computing, implementation of the teachings recited herein are not limited to a cloud computing environment. Rather, the embodiments of the present invention are intended to be implemented with any type of clustered computing environment now known or later developed.

Figure 4:
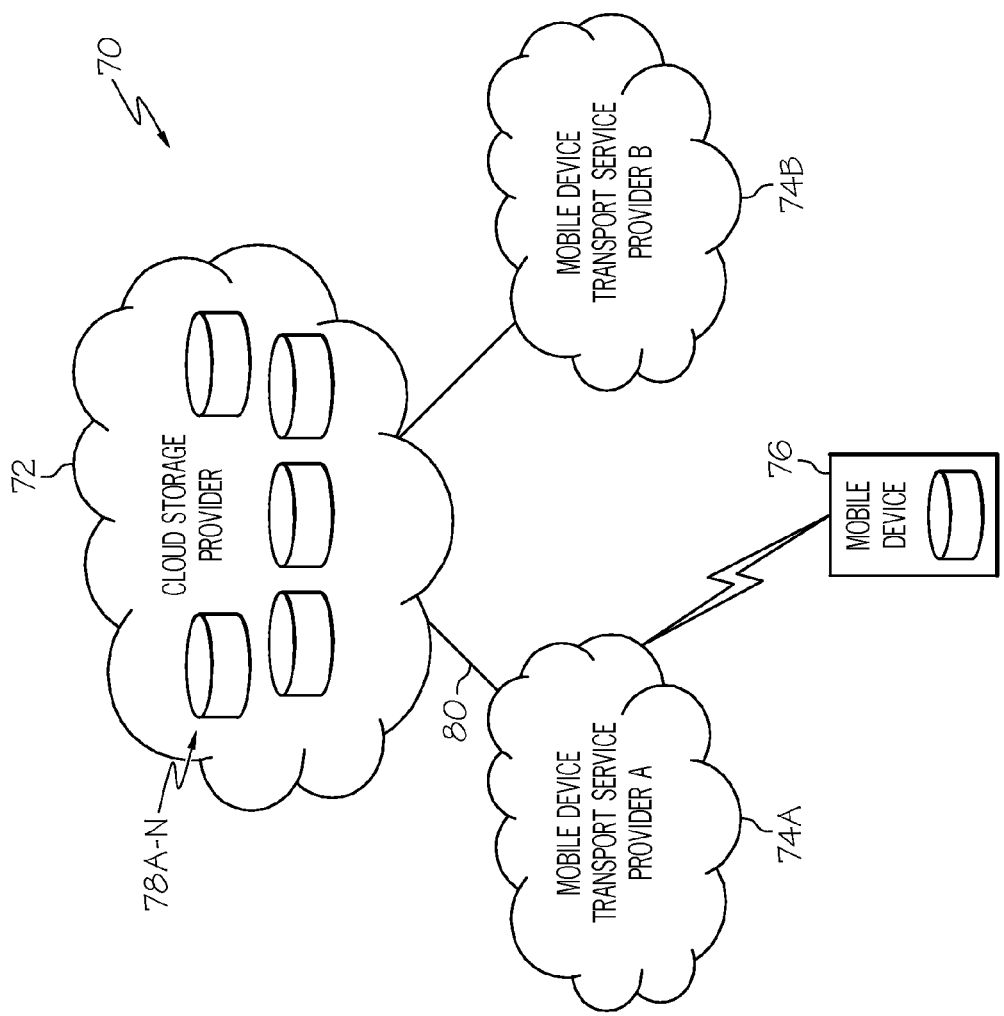
FIG. 4 depicts a system for optimizing data transfer between a mobile device and a cloud storage provider according to an embodiment of the present invention.

Referring now to FIG. 4 a system 70 for optimizing data transfer between a mobile device 76 and a cloud storage provider 72 is shown. As depicted, mobile device 76 is accessing mobile device transport service provider 74A. However, it is understood that one or more other mobile devices could be shown depicting either mobile device transport service provider 74A and/or 74B. In general, embodiments of the present invention analyze and/or consider a set of factors in determining what file(s) will be transferred from mobile device 76 to one or more cloud storage devices 78A-N via link 80. These factors typically include:

(1) The percentage of local storage being consumed on mobile device 76. For example, it would be determined that if the storage being consumed is greater than a predestined storage threshold (e.g., 75% of total capacity), then file(s) will attempt to be selected for transfer to cloud storage device(s) 78A-N.

(2) The mobile device 76's billing/data plan, and whether file transfer will cause the billing plan to be exceeded. The determination of whether the billing plan will be exceeded is typically based upon a size of a file being considered for transfer. For example, it will be determined whether transfer of file X having size Y will push the data usage for mobile device 76 over the billing plan limit and cause increased charges for the user.

(3) A capacity of a link 80 between mobile device 76 and the cloud storage provider and what data size the link 80 can safely accommodate. For example, it can be determined if the bandwidth/capacity of link 80 will be approached or exceeded by transferring a file or group of files (e.g., based on the size(s) of the file(s)). Along these lines, a predetermined capacity threshold could be established that, if equaled or exceeded, will prevent the transfer from occurring. For example, if the file transfer would cause 80% of the capacity of link 80 to be consumed, the operation could be aborted and/or the analysis could be repeated in an attempt to select files that would reduce the toll on link 80's capacity. Alternatively, when the predetermined capacity threshold is reached, embodiments of the invention could break the file transfer into a plurality of smaller file transfers that, individually, consume less link 80 capacity.

(4) Dates of last access for files stored on mobile device 76. For example, it could be determined that a file X is a candidate for transfer if it has not been accessed with a predetermined period of time (e.g., within the last 30 days). The rationale being that since file X has not been accessed for the predetermined period of time, local access of file X may not be a priority over the resulting increased storage capacity resulting from file X's transfer.

(5) A power remaining on mobile device 76 (if on battery power). For example, it can be determined (based on their size) whether transfer of one or more files would cause the battery power of mobile device 76 to fall below a predetermined threshold (e.g., 20%). In such a case, the operation could be aborted, or the transfer could be held in abeyance until the device is plugged in or the battery is sufficiently charged.

By using these factors regarding the billing/data plan, link capacity, carrier, power remaining, cost of the transfer from the end user to the service provider, and the selection of service provider, the transfer of information between the mobile device and the cloud storage can be optimized. With respect to billing plans, mobile device providers offer different types of billing plans. Examples include an unlimited plan, a plan based on data or bandwidth usage, a flat rate plan, etc. Moreover, rates under these plans may vary based upon time of day and/or day of the week. As such, the billing plan can be an important consideration when using mobile devices. Additionally, the storage on the mobile device can be used more economically and efficiently. In addition, embodiments of this invention aligns with the efficient energy usage concepts in which environmental information is used to make informed decisions. In this case, environmental information about the device's remaining power, the wireless link capacity, and the size of the unused allocation for billing period data transfer are all considered in determining if, when, and how much information should be moved from the mobile device to the cloud storage system.

Figure 5:
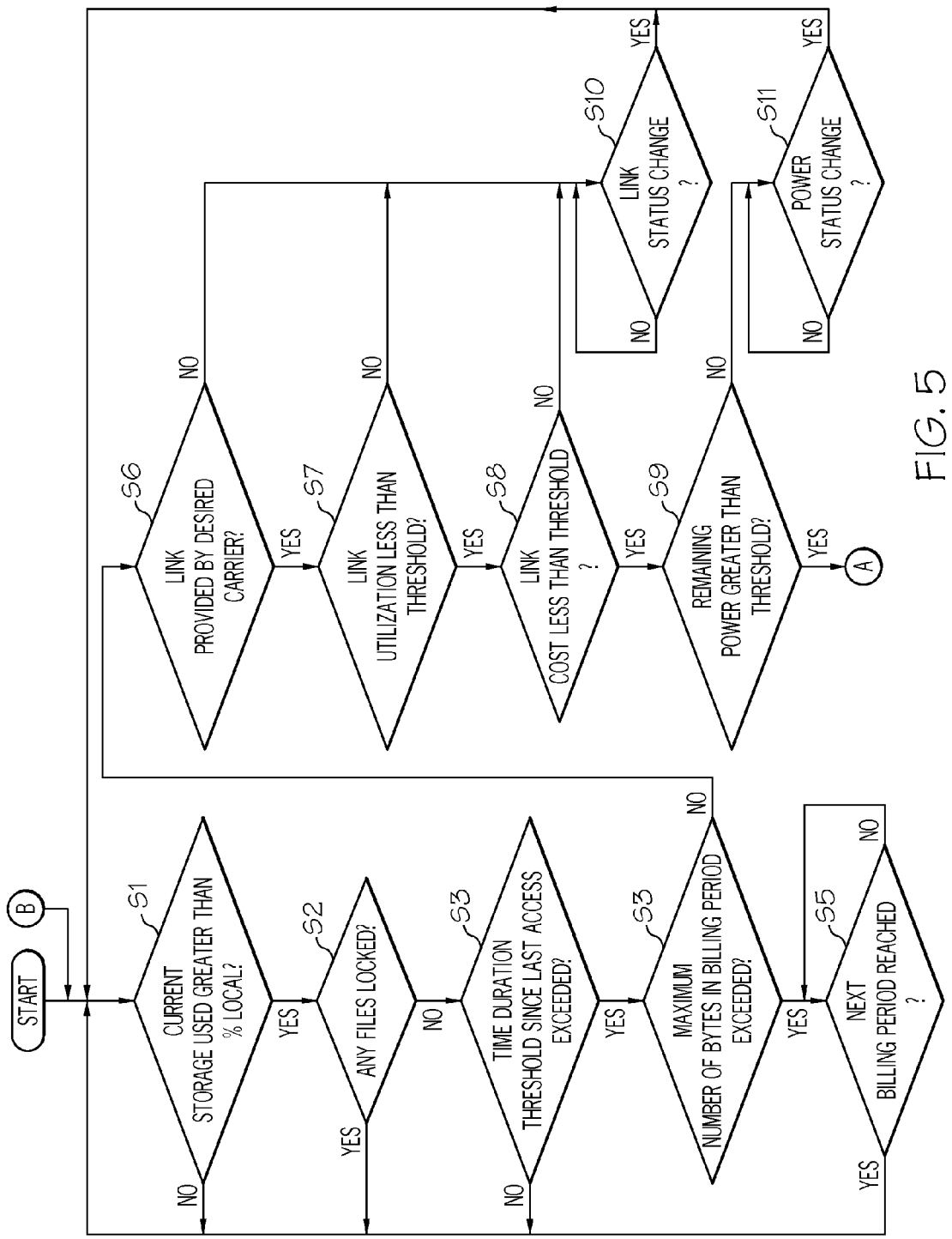
FIG. 5 depicts a method flow diagram according to an embodiment of the present invention.

Referring now to FIG. 5, a method flow diagram according to embodiments of the present invention is shown. Specifically, FIG. 5 illustrates the preparation phase in which rules are established. The minimum link rate, cost attributes, allowable service provider, percentage of local storage that is full, and the duration of the time since last access are initialized. Additional environmental attributes may also be considered hereunder, such as time of day, quality of cloud storage (retrieval speed, cloud storage attributes, etc.). As shown, after the process is started, it is determined in step S1 whether the current storage being used is greater than a predetermined storage threshold. If not, the process is stopped and returned to step S1. If so, the process continues to step S2 where it is determined whether any files are locked. If so, then the process returns to step S1. If not, it is determined in step S3 whether a time duration threshold has been exceeded. That is, it is determined whether any files have not been recently accessed within a predetermined period of time. If the threshold has not been exceeded (e.g., all files have been recently accessed), then the process returns to step S1. If the threshold has been exceeded (e.g., there are files that have not been recently accessed, then it is determined whether the maximum number of bytes has already been exceeded or approached in the current billing period in step S4. If so, it is determined in step S5 whether the next billing period has been reached. If not, transfer is avoided until the next billing period has been reached. Once the next billing period has been reached, the process returns to step S1. However, if there was sufficient capacity within the current billing period in step S4, it is determined whether the link is provided by the desired carrier in step S6. If not, it is determined whether the link status has changed in step S10. If not, transfer is avoided until the link status has changed at which point the process returns to step S1. However, if in step S6, the link is being provided by a desired carrier, it is determined in step S7 whether the link utilization is less than a predetermined capacity threshold. That is, it is determined whether the files tentatively selected for transfer (e.g., those files that are unlocked and not recently accessed as determined by steps S2 and S3) can be transferred via the link and not consume too high a percentage of the link's capacity. If not, the process flows to step S10 as previously described. If so, then it is determined whether the link cost is less than a predetermined cost threshold in step S8. If not, the process flows to step S10. If so, it is determined in step S9 whether the power remaining in the mobile device is greater than a predetermined power threshold. If not, the process flows to step S11 where a power change status is awaited at which time the process returns to step S1. However, if there was sufficient power remaining in the mobile device in step S9, the process flows to block A of FIG. 6.

Figure 6:
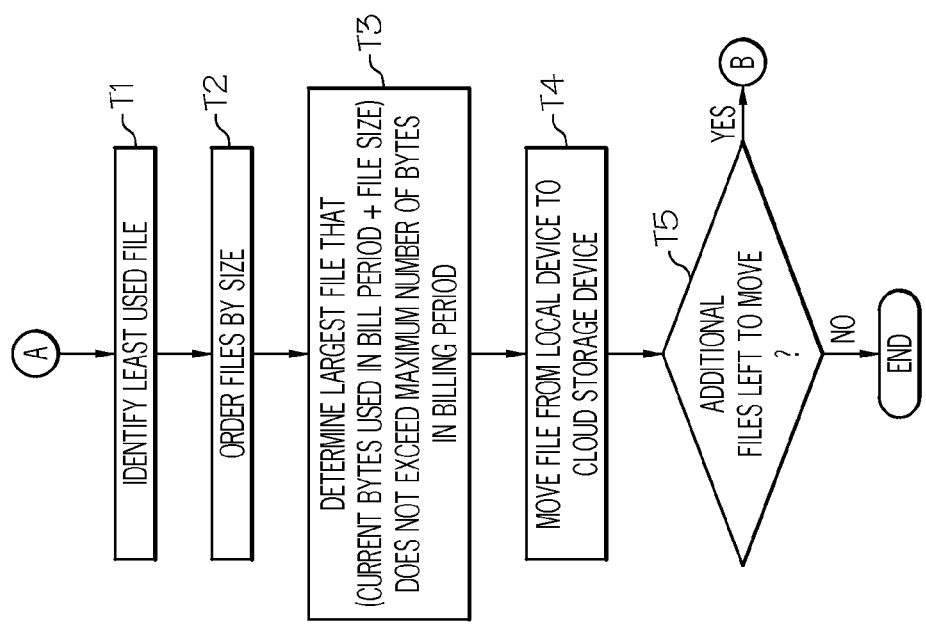
FIG. 6 depicts another method flow diagram according to an embodiment of the present invention.

Referring now to FIG. 6, another method flow diagram is shown. Specifically, FIG. 6 shows the actual transfer process involved with transferring a file from a mobile device to a cloud storage provider. As shown, in step T1, a least used file is identified. In step T2, file(s) are then placed in order by their size(s) in step T2. In step T3, the largest file that does not exceed the maximum number of bytes in the current billing period is determined/identified and selected for transfer. In step T4, the file is moved from local storage of the mobile device to a cloud storage device. Along these lines, the file can be deleted from the mobile device after the transfer has been confirmed. In step T5, it is determined whether any other files are remaining to be transferred. If not, the process ends. If so, the process returns to block B of FIG. 5.

While shown and described herein as a mobile device to cloud storage optimization solution, it is understood that the invention further provides various alternative embodiments. For example, in one embodiment, the invention provides a computer-readable/useable medium that includes computer program code to enable a computer infrastructure to provide intelligent network storage planning functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide a mobile device to cloud storage optimization functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for a mobile device to cloud storage optimization functionality. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for optimizing data transfer between a mobile device and a cloud storage provider, comprising:
   conducting an analysis of a billing plan of the mobile device and an amount of data that can be transferred from the mobile device while remaining within the billing plan;
   determining a capacity of a link between the mobile device and the cloud storage provider;
   determining dates of last access, by a user from the mobile device, of at least one data file of a set of files on the mobile device;
   determining whether any of the determined dates of last access of the set of files is within a predetermined period of time;
   determining which files of the set of files are unlocked;
   evaluating whether a file transfer of the amount of data would cause a power remaining on the mobile device to fall below a predetermined capacity;
   selecting at least one unlocked data file from the set of files for transfer to the cloud storage provider for storage at the cloud storage provider, the selecting being based on the analysis, the capacity, the evaluation, and the dates of last access, wherein the date of last access of the at least one data file is within the predetermined period of time;
   if the transfer of the selected at least one unlocked data file exceeds a predetermined threshold of the bandwidth of the link, breaking the at least one unlocked data file into a plurality of smaller files that, individually, each consume less capacity than the predetermined threshold; and
   transferring the plurality of smaller files for storage at the cloud storage provider via the link such that the at least one unlocked data file is no longer located on the mobile device.

2. The method of claim 1, further comprising determining if a next billing period has been reached if the analysis determines that usage under the billing plan has reached its limit.

3. The method of claim 1, the transferring comprising:
   sending the at least one data file from the mobile device to the cloud storage provider via the link;
   storing the at least one data file in a storage device associated with the cloud storage provider; and
   removing the at least one data file from the mobile device.

4. The method of claim 1, the selecting comprising selecting the at least one data file if the at least one data file has a data size that would not cause the billing plan to be exceeded.

5. The method of claim 1, the selecting comprising selecting the at least one data file if the link has a capacity that would not be exceeded by transferring the at least one data file.

6. The method of claim 1, further comprising storing the at least one data file on the cloud storage provider.

7. A system for optimizing data transfer between a mobile device and a cloud storage provider, comprising:
   a bus;
   a processor coupled to the bus; and
   a memory medium coupled to the bus, the memory medium comprising instructions to:
      conduct an analysis of a billing plan of the mobile device and an amount of data that can be transferred from the mobile device while remaining within the billing plan;
      determine a capacity of a link between the mobile device and the cloud storage provider;
      determine dates of last access, by a user from the mobile device, of at least one data file of a set of files on the mobile device;
      determine whether any of the determined dates of last access of the set of files is within a predetermined period of time;
      determine which files of the set of files are unlocked;
      evaluate whether a file transfer of the amount of data would cause a power remaining on the mobile device to fall below a predetermined capacity;
      select at least one unlocked data file from the set of files for transfer to the cloud storage provider for storage at the cloud storage provider, the selecting being based on the analysis, the capacity, the evaluation, and the dates of last access, wherein the date of last access of the at least one data file is within the predetermined period of time;

if the transfer of the selected at least one unlocked data file exceeds a predetermined threshold of bandwidth of the link, break the at least one unlocked data file into a plurality of smaller files that, individually, each consume less capacity than the predetermined threshold; and transfer the plurality of smaller files for storage at the cloud storage provider via the link such that the at least one unlocked data file is no longer located on the mobile device.

8. The system of claim 7, the memory medium further comprising instructions to determine if a next billing period has been reached if the analysis determines that the billing plan has reached its limit.

9. The system of claim 7, the memory medium further comprising instructions to:

send the at least one data file from the mobile device to the cloud storage provider via the link;

store the at least one data file in a storage device associated with the cloud storage provider; and remove the at least one data file from the mobile device.

10. The system of claim 7, the memory medium further comprising instructions to select the at least one data file if the at least one file has a data size that would not cause the billing plan to be exceeded.

11. The system of claim 7, the memory medium further comprising instructions to select the at least one data file if the link has a capacity that would not be exceeded by transferring the file.

12. The system of claim 7, the memory medium further comprising instructions to store the at least one data file on the cloud storage provider.

13. A computer program product for optimizing data transfer between a mobile device and a cloud storage provider, the computer program product comprising a non-transitory computer readable storage medium, and program instructions stored on the computer readable storage media, to:

conduct an analysis of a billing plan of the mobile device and an amount of data that can be transferred from the mobile device while remaining within the billing plan;

determine a capacity of a link between the mobile device and the cloud storage provider;

determine dates of last access, by a user from the mobile device, of at least one data file of a set of files on the mobile device;

determine whether any of the determined dates of last access of the set of files is within a predetermined period of time;

determine which files of the set of files are unlocked;

evaluate whether a file transfer of the amount of data would cause a power remaining on the mobile device to fall below a predetermined capacity;

select at least one unlocked data file from the set of files for transfer to the cloud storage provider for storage at the cloud storage provider, the selecting being based on the analysis, the capacity, the evaluation, and the dates of last access, wherein the date of last access of the at least one data file is within the predetermined period of time;

if the transfer of the selected at least one unlocked data file exceeds a predetermined threshold of bandwidth of the link, break the at least one unlocked data file into a plurality of smaller files that, individually, each consume less capacity than the predetermined threshold; and transfer the plurality of smaller files for storage at the cloud storage provider via the link such that the at least one unlocked data file is no longer located on the mobile device.

14. The computer program product of claim 13, further comprising program instructions stored on the non-transitory computer readable storage medium to determine if a next billing period has been reached if the analysis determines that the billing plan has reached its limit.

15. The computer program product of claim 13, further comprising program instructions stored on the non-transitory computer readable storage medium to:

send the at least one data file from the mobile device to the cloud storage provider via the link;

store the at least one data file in a storage device associated with the cloud storage provider; and remove the at least one data file from the mobile device.

16. The computer program product of claim 13, further comprising program instructions stored on the non-transitory computer readable storage medium to select the at least one data file if the at least one file has a data size that would not cause the billing plan to be exceeded.

17. The computer program product of claim 13, further comprising program instructions stored on the non-transitory computer readable storage medium to the at least one data file if the link has a capacity that would not be exceeded by transferring the file.

18. The computer program product of claim 13, further comprising program instructions stored on the non-transitory computer readable storage medium to store the at least one data file on the cloud storage provider.

19. A method for deploying a system for optimizing data transfer between a mobile device and a cloud storage provider, comprising:

providing a computer infrastructure having functionality to:

conduct an analysis of a billing plan of the mobile device and an amount of data that can be transferred from the mobile device while remaining within the billing plan;

determine a capacity of a link between the mobile device and the cloud storage provider;

determine dates of last access, by a user from the mobile device, of at least one data file of a set of files on the mobile device;

determine whether any of the determined dates of last access of the set of files is within a predetermined period of time;

determine which files of the set of files are unlocked;

evaluate whether a file transfer of the amount of data would cause a power remaining on the mobile device to fall below a predetermined capacity;

select at least one unlocked data file from the set of files for transfer to the cloud storage provider for storage at the cloud storage provider, the selecting being based on the analysis, the capacity, the evaluation, and the dates of last access, wherein the date of last access of the at least one data file is within the predetermined period of time;

if the transfer of the selected at least one unlocked data file exceeds a predetermined threshold of bandwidth of the link, break the at least one unlocked data file into a plurality of smaller files that, individually, each consume less capacity than the predetermined threshold; and transfer the plurality of smaller files for storage at the cloud storage provider via the link such that the at least one unlocked data file is no longer located on the mobile device.

* * * * *